United States Patent [19]
Taishoff

[11] Patent Number: 4,631,455
[45] Date of Patent: Dec. 23, 1986

[54] METHOD AND APPARATUS FOR CONVERTING A CONVENTIONAL INTERNAL COMBUSTION ENGINE INTO A HIGH SPEED ELECTRIC MOTOR AND GENERATOR

[76] Inventor: Howard A. Taishoff, 105 Oxford Blvd., Great Neck, N.Y. 11023

[21] Appl. No.: 697,690

[22] Filed: Feb. 4, 1985

Related U.S. Application Data

[63] Continuation-in-part of Ser. No. 551,849, Nov. 15, 1983, abandoned.

[51] Int. Cl.⁴ ............................................. H02K 33/12
[52] U.S. Cl. ..................................... 318/37; 318/128; 290/1 R; 310/24; 310/34; 310/35
[58] Field of Search ................... 318/37, 38, 127–132; 310/23, 24, 34, 35, 15; 290/1

[56] References Cited

U.S. PATENT DOCUMENTS

| | | | |
|---|---|---|---|
| 2,338,005 | 12/1943 | Morch | 310/24 |
| 3,105,153 | 9/1963 | James, Jr. | 310/15 X |
| 3,206,609 | 9/1965 | Dawes | 310/15 X |
| 3,832,608 | 8/1974 | Mills | 310/24 X |
| 4,012,675 | 3/1977 | Schulze, Jr. | 310/24 X |
| 4,019,103 | 4/1977 | Davis et al. | 310/24 X |
| 4,317,058 | 2/1982 | Blalock | 310/24 |
| 4,359,673 | 11/1982 | Bross, Jr. et al. | 310/24 X |
| 4,510,420 | 4/1985 | Susso | 310/24 X |

Primary Examiner—Donovan F. Duggan
Attorney, Agent, or Firm—Howard Alan Taishoff

[57] ABSTRACT

An electric starter motor and generator is integrated into the structure of an internal combustion engine by making the ferromagnetic pistons of the engine the relatively moving elements in the starter and generator. A coil is solenoidally wound around each sleeve of the engine. An electronically controlled switch sends battery current into an appropriate coil inducing a powerful magnetic field therearound. The magnetic field and piston interact resulting in a powerful magnetic force which moves the piston and thus cranks the engine. At appropriate times in the operation of the engine, fuel to the same can be shut off and the engine run as a high speed electric motor.

14 Claims, 8 Drawing Figures

U.S. Patent   Dec. 23, 1986   4,631,455
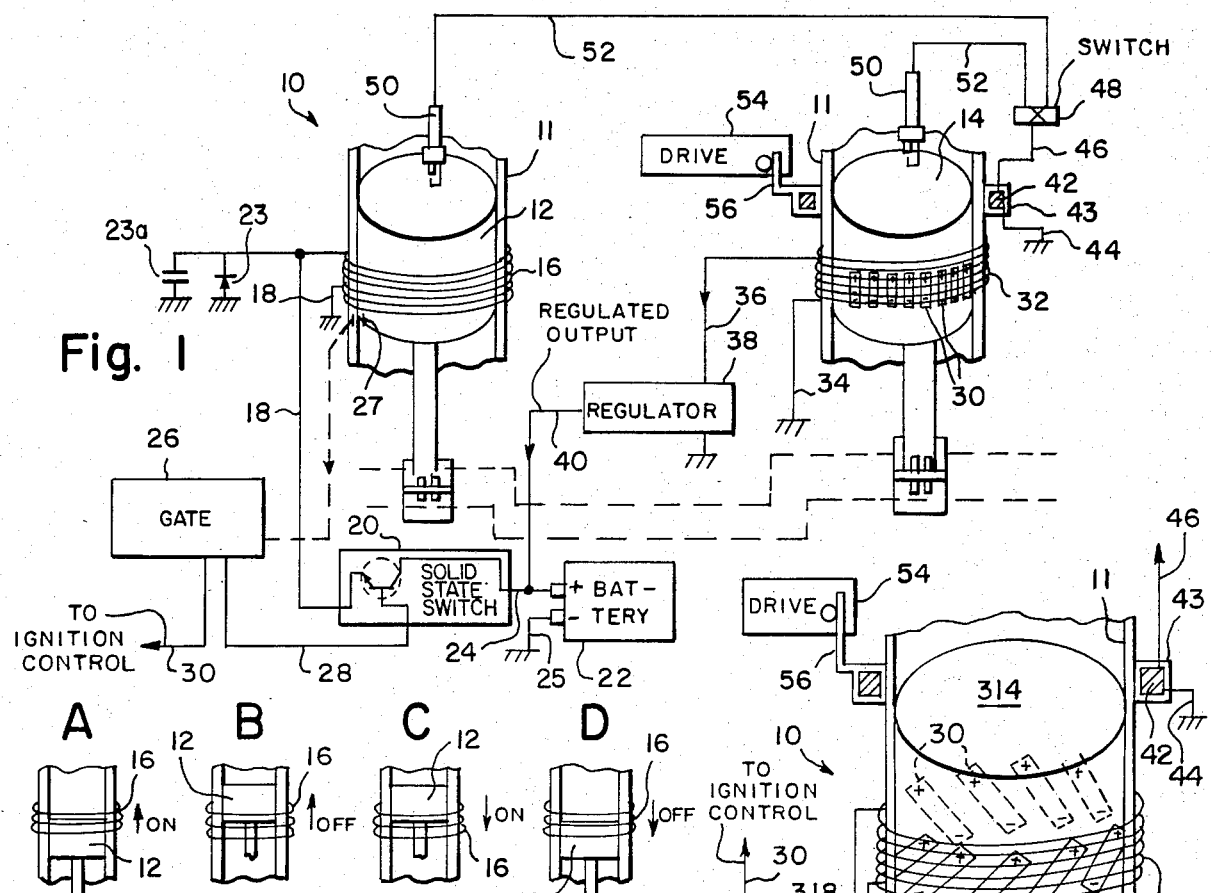
Fig. 1
Fig. 2
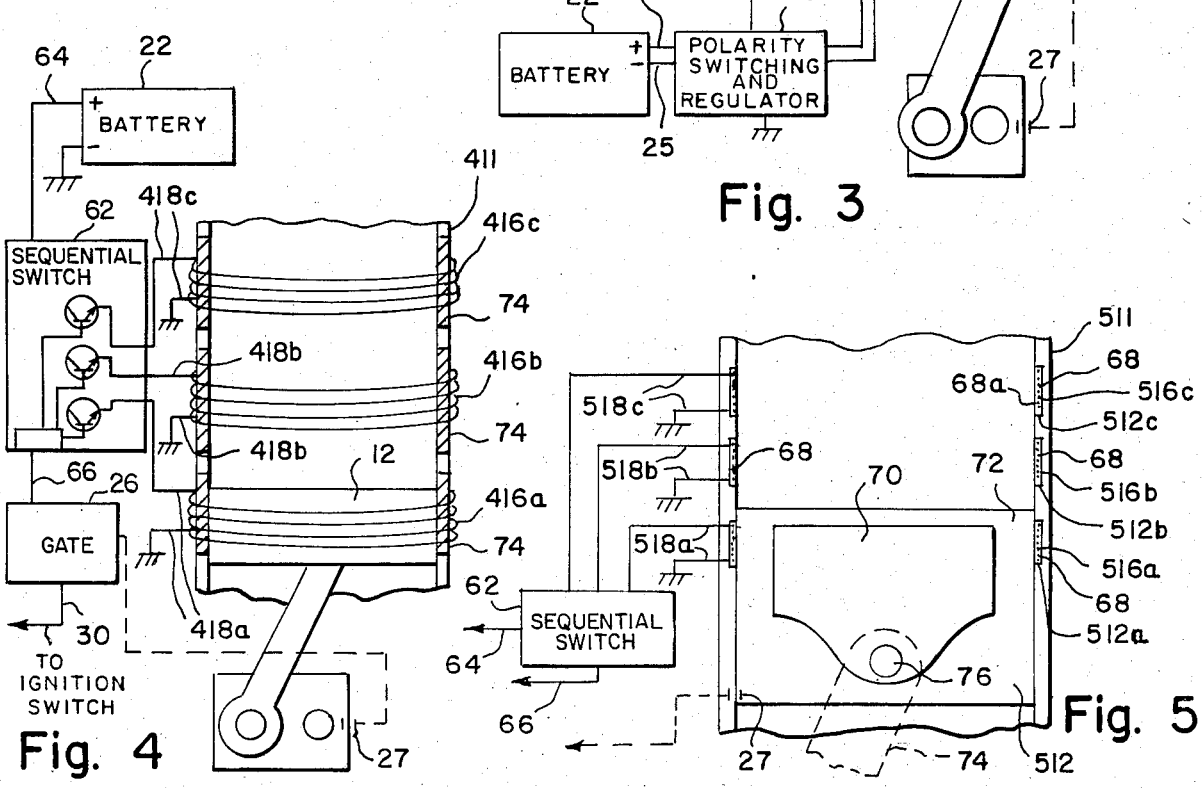
Fig. 3
Fig. 4
Fig. 5

METHOD AND APPARATUS FOR CONVERTING A CONVENTIONAL INTERNAL COMBUSTION ENGINE INTO A HIGH SPEED ELECTRIC MOTOR AND GENERATOR

This is a continuation-in-part of application Ser. No. 06/551,849, filed Nov. 15, 1983, now abandoned.

This invention relates to an electric motor and generator and, more particularly, to a starter motor and generator that is integrated into the structure of an internal combustion engine.

As conventionally practiced, internal combustion engines includes both a discrete alternator, or generator, for generating electrical current, and a discrete starter motor for starting the engine. Each of these systems is a rather expensive assembly and each is prone to mechanical and electrical failure. But apart from this, these two discrete systems add weight to the engine assembly. In fact in the newer, lighter, two, three, and four cylinder engines, the weight of a conventional starter and alternator is a significant part of the total weight of the engine. This added mass results in reduced vehicle performance and particularly reduced fuel economy. Then, too, since conventional starter motors are relatively low speed engines and are not designed for continuous duty, they are unsuited as a primary means for powering the vehicle.

The present invention overcomes these drawbacks and renders superfluous the dichotomy existing between the conventional alternator and starter by eliminating both as presently practiced. In general, the present invention employs the relative motion between the piston of the engine and a coil placed in the block and wound around the combustion chamber sleeve. More particularly and in one embodiment of the present invention, a high current coil is solenoidally wound around one or a number of the sleeves of an internal combustion engine. A magnetic piston or piston comprised of permanent magents is supplied and reciprocates in conventional movement in the sleeve. When a sufficiently high current is sent into the coil, in appropriate phase or of proper electrical polarity with respect to the position of the piston and magnetic pole thereof, the piston will experience a powerful electromagnetic force which will cause the piston to move relative to the sleeve. By appropriately driving the coils of the various cylinders, a "starter" effect is realized thus cranking the engine. Once the engine starts, current into the coils is shut off. As the magnetic field emanating from the moving piston cuts across the relatively stationary coil, an EMF is induced therein. This induced EMF can be used to charge a battery or, if stepped up to a high enough voltage, can be used to fire a spark plug. Indeed, the inventive apparatus is capable of continuous high speed, reciprocating, electric motor operation by appropriate high speed switching of current into the coils.

It is therefore an object of the present invention to provide a method and apparatus for converting a conventional internal combustion engine into a high speed electric motor and generator.

It is another object of the present invention to provide a means for generating electricity for an internal combustion engine wherein the pistons thereof provide the link between an electrical system or electric motor on the one hand and an internal combustion or heat system on the other thus making a singularity out of the two systems.

It is a further object of the present invention to provide a common operative element between a heat engine and an electric motor so that it is possible to switch between the two systems without the need for an intermediate system such as a belt, gear, transmission or the like.

It is another object of the present invention to provide a starter motor and generator for an internal combustion engine wherein the starter motor is capable of continuous high speed operation, is integrated into the structure of the engine, and adds no moving parts thereto.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

In the drawings, wherein the same reference numeral denotes the same element throughout the several views:

FIG. 1 is a diagrammatic perspective view showing one embodiment of the inventive apparatus wherein one of the pistons of an internal combustion engine is used as the moving element in an electric starter or electric motor and another one of the pistons is used as the moving element in a generator;

FIGS. 2A, 2B, 2C, and 2D are diagrammatic representations of the operation of the starter motor shown in FIG. 1;

FIG. 3 is a diagrammatic perspective view showing another embodiment of the present invention wherein a single magnetic or magnetized piston operates as both a starter motor and generator;

FIG. 4 is another embodiment of a starter motor and generator built according to the present invention; and FIG. 5 is a diagrammatic sectional view of another embodiment of the present invention.

In detail now and referring to the drawings, FIG. 1 shows the inventive apparatus applied to or integrated into the structure of a multicylinder internal combustion engine. The engine is indicated generally as reference numeral 10 and is formed with a plurality of cylinders or sleeves 11. A conventional ferromagnetic piston 12 reciprocates in one of sleeves 11. A "magnetic" or permanently magnetized piston 14, which is discussed in detail below, reciprocates in another one of sleeves 11. Each one of the pistons is attached to a crankshaft in conventional manner.

A coil 16 is solenoidally wound around the external periphery of associated sleeve 11 and affixed thereabout. Coil 16 is of high current handling capacity and is of a sufficient number of turns to create a high magnetic flux when electric current is passed therethrough. The coil is, preferably, placed at approximately the midpoint of the linear displacement or stroke of the piston relative to sleeve 11. The lengthwise or axial dimension of the coil extends a short distance along the longitudinal axis sleeve 11. Thus, coil 16 covers only a localized axial region around the sleeve. This creates a pronounced geometric asymmetry between the piston and coil when the piston is at the extremes of its travel, i.e., when the piston is at top-dead-center and when it is at bottom-dead-center.

Coil 16 terminates in two leads 18 one of which is grounded or placed at chassis potential and the other of which is electrically coupled to the output or switched end of a high-power solid state switch 20. The input or other end of switch 20, is, of course, electrically connected to the positive terminal of a car battery 22 by means of a high current lead 24. Solid state switch 20 is common in the art and might comprise a high-power bipolar or FET transistor, or an SCR. Switch 20 is diagrammatically shown as NPN power transistor. However, it will be apparent to those in the art that a PNP device will work equally well. Because solid state device 20 switches relatively high currents (in the tens of amps), the switch might comprise a parallel array of power transistors. Being more specific, five or six paralleled 2N3055 power transistors (with emitter balancing resistors) could handle such switching functions. A high-power diode 23 is electrically connected to lead 18 so that the diode is, in a manner of speaking, reversed biased with respect to voltage existing on lead 18. A high frequency bypass capacitor 23a has one lead electrically connected to lead 18 and the other lead connected to electrical ground. The paralleled diode and capacitor act to supress inductive spikes that appear on lead 18 during use and operation of the invention as will be described below. A lead 25 electrically couples the negative terminal of battery 22 to the car chassis thus placing the same at ground potential. A gate or controller 26 whose operation is slaved to or dependent on the position of piston 12 relative to coil 16, controls the operation of solid state switch 20 by means of a low current control lead 28. Gate 26 is, in effect, an electronic (solid state) switch. In its simplest form, gate 26 can be a single low-power transistor designed to drive or activate high-power switch means 20. In a more sophisticated form, gate 26 can be one of several TTL or CMOS integrated circuits having sufficient drive capability to turn on means 20. Indeed, in its most sophisticated form, gate 26 can be a microprocessor or microcomputer. Gate 26 receives information relating to the position of the piston from one or several position sensing devices 27. Such position sensing devices are common in the art and, for example, might comprise a Hall-effect switch whose output is used to time or trigger gate 26. An ignition control "hot" lead 30 applies power to gate 26 during use and operation of the invention as will be described below.

As noted above, piston 14 is "magnetic." It is magnetic in the sense that it is comprised of permanently magnetized material so that a magnetic flux or field emanates from the piston. This is accomplished by embedding a plurality of sector-like or segment-like magnets 30 along and flush with the annular cylindrical face of piston 14. Each magnet 30 of the segmented array is held in place to form a pattern whereby the respective north and south poles of each magnet 30 align with associated ends of the piston. Thus, taken as a whole, one end of piston 14 has a distinct positive pole and the other end of the piston has a distinct negative pole. In the construction of piston 14, magnets 30 can be spot or sonic welded in complementary sized seats formed along the annular periphery of the piston and then machined for dimensional conformity with the bore of sleeve 11. Of course there are numerous ways of magnetizing or making piston 14 permanently magnetic. For example, piston 14 might be comprised of stacked, split, donut shaped concentric magnetic rings, or, part of the piston can be permanently magnetized as one pole of a magnet and another part of the piston can be magnetized as the other pole of the magnet. Irrespective of the way piston 14 is permanently magnetized, the important design criteria is to maximize the flux density or strength of the magnetic field emanating from the piston, maximize the magnetic interaction between piston and coil, and select magnetic material that will retain magnetic properties at the relatively high temperatures experienced by the piston body.

A low voltage high current coil 32 is solenoidally wound around the external periphery of cylinder or sleeve 11, as shown. As with coil 16, coil 32 preferably extends a short distance along the longitudinal axis of sleeve 11 and is fixed or held immobilized with respect thereto. The coil is positioned so as to reside in the swept area traversed by magnets 30. One lead 34 of coil 32 is electrically grounded or placed at chassis potential. The other or hot lead 36 of coil 32 is electrically coupled to a voltage regulator 38. A lead 40 applies the regulated output of regulator 38 to battery 22 for charging the same during use and operation of the invention as will be described below.

A high voltage coil 42 is solenoidally wound around the external periphery of associated sleeve 11 near the top thereof and embedded in a rigid high temperature dielectric material or frame 43. Coil 42 and frame 43 thus form a short localized collar that is moveable or slidable about cylinder 11. Coil 42 is positioned near the top-dead-center region defined by the travel of piston 14 and is disposed with respect thereto so as to experience the magnetic flux emanating from the piston when the same is at or near the top extreme of its travel. One side or lead 44 of coil 42 is placed at ground or chassis potential. The other or hot lead 46 of coil 42 is electrically coupled to a high voltage switch or distributor 48. Switch 48 distributes the high voltage developed by coil 42 to a given spark plug 50 along an associated lead 52.

To effect a timing of the engine and provide for a type of ignition advance of the high voltage delivered to spark plugs 50, coil frame 43 can be moved or indexed "up and down," so to speak, relative to cylinder 11 by means of a vacuum operated or electrically operated drive 54 connected to coil frame 43 by means of a rigid link 56.

In use and operation of the embodiment of FIG. 1 and to start the engine, gate 26 is activated by means of ignition line 30. Assume for the moment that the position of piston 12 relative to coil 16 is such that, as shown in FIG. 2A, the piston is asymmetrically placed with respect to coil 16, or more simply put, offset with respect thereto and poised to *move towards* coil 16. Means 27 triggers gate 26. Gate 26 then applies current to solid state switch 20 turning the same on and sending battery current into coil 16. The low impedance of the coil causes a large flow of current therethrough. The magnetic flux set up by this current flow and the solenoidal winding of the coil acts as a powerful electromagnet and magnetically attracts ferromagnetic piston 12 pulling the same into or towards the coil. This action causes the engine to crank. When piston 12 reaches the center of coil 16, the magnetic force on the piston becomes balanced and the piston will tend to remain in the center of the coil. However, owing to inertia of the crankshaft and flywheel, piston 12 will tend to continue upwardly, moving out of and away from coil 16. If coil 16 were to remain "on" during this movement, the powerful magnetic flux of the coil would act as a retarding force on the piston for such relative movement of the piston away from the coil. To prevent this retarding action, means 27 signals gate 26. The latter turns off solid state switch 20 when piston 12 reaches the center of coil 16, as shown in FIG. 2B. Thus as piston 12 continues on its upward stroke and moves away from coil 16, current to coil 16 is shut off. When piston 12 reaches top-dead-center in its stroke, as shown in FIG. 2C, means 27 now signals gate 26. Gate 26 turns on solid state switch 20 sending current into coil 16. The powerful magnetic flux set up around the coil will attract piston 12. And, as noted above with reference to FIG. 2A, the magnetic field will cause piston 12 to move towards the center of the coil, thus adding to the cranking of the engine. When piston 12 reaches the center of the coil, as shown in FIG. 2D, gate 26 will, as noted above with reference to FIG. 2B, turn off switch 20 interrupting the flow of current to coil 16. Thus, as piston 12 continues to move downwardly away from coil 16, current to the coil is shut off. When piston 12 reaches bottom-dead-center in its stroke, as shown in FIG. 2A, means 27 signals gate 26. The latter turns on switch 20. This sends current into coil 16 causing the cycle to repeat and effect a further cranking of the engine. Once the engine starts, the output of gate 26 is kept at a logic or drive level that keeps solid state switch 20 off permanentally to interrupt the flow of battery current into coil 16.

As magnetic piston 14 moves "up and down" relative to coils 32 and 42, the magnetic flux emanating from the array of magnets 30 cuts across both relatively stationary low voltage coil 32 and then, near the top extreme of its travel, high voltage coil 42. This moving magnetic flux induces a voltage in each coil in proportion to its respective turns ratio. Thus, the relatively moving flux induces a voltage across coil 32 and, owing to the relatively low turns ratio thereof, a low voltage high current output appears across coil hot lead 36. Lead 36 electrically couples the generated output to regulator 38. Lead 40 applies the regulated output from regulator 38 to battery 22 charging the same. The relatively moving magnetic flux also induces a voltage across coil 42. Owing to the relatively high turns ratio of coil 42, a relatively high voltage low current output appears across coil lead 46. Lead 46 electrically couples this induced high voltage to high voltage switch or distributor 48. The switched, high voltage output of distributor 48 is applied, at appropriate times, to a given plug 50 along associated high voltage leads 52.

To time the ignition, drive means 54 and link 56 are adapted to move or selectively index frame 43 and hence coil 42 "up and down" relatively to sleeve 11 and the top-dead-center position of piston 14. Drive means 54 can be a vacuum operated or electrically operated motor and as such is common in the art. Movement of the axial position of coil 42 relatively to both cylinder 11 and permanently magnetized piston 14 will advance or retard the time when, relative to the operation of the engine, the high voltage appears across coil 42.

Turning now to FIG. 3 there is shown another embodiment of the present invention wherein a single low voltage coil and magnetic piston act as both a starter motor and electric generator. A low voltage high current coil 316 is solenoidally wound around sleeve 11. As with coils 16 and 32, noted above, coil 316 extends for only a limited distance along the longitudinal axis of sleeve 11 and is fixed or held immobilized with respect thereto. Coil 316 is positioned so as to reside within the swept area traversed by magnets or magnetic array 30. The two leads or wire ends 318 of coil 316 are electrically coupled to a polarity switch means and regulator 60. The polarity switch means is, as will be described below, adapted to invert or reverse the polarity of the battery current sent into coil leads 318 and as such is common in the art. A high voltage coil 42, in all respects similar in construction to coil 42 of FIG. 1, is solenoidally would around sleeve 11 near the top thereof and embedded in a dielectric material or frame 43 thus forming the slidable collar, noted above. One end or lead 44 of coil 42 is electrically placed at ground or chassis potential. The other end or hot lead 46 of coil 42 is electrically coupled to a high voltage distributor or switch, not shown, which distributes the high voltage in timed sequence to an appropriate spark plug. A vacuum operated or electrically operated drive mechanism 54 is, as noted above, mechanically coupled to coil frame 43 by means of a rigid link 56. Respective leads 24 and 25 electrically couple the positive and negative terminal of battery 22 to polarity reversing means and regulator 60. A lead 330 electrically couples gate or microprocessor means 26 to polarity switch and regulator means 60 such that the former mentioned means controls the latter mentioned one during use and operation of the invention as will be described below.

A magnetic piston 314, somewhat similar to piston 14 of FIG. 1, is disposed in sleeve 11 and reciprocates with respect thereto. Piston 314 is made magnetic by embedding a plurality of bar-like magnets 30 along and flush with the annular cylindrical periphery of the piston. It will be noticed that, in elevation, each magnet 30 is given a similar tilt or canted disposition with respect to the longitudinal axis of the piston thus to form an angulated array wherein the respective positive and negative poles of each magnet align with an associated end of the piston. Hence, taken as a whole, magnetic piston 314 has a distinct positive pole and a distinct negative pole given to it by the aligned poles of magnetic array 30. Therefore, depending on the induced polarity of the magnetic field set up in coil 316, which, in turn, depends on the direction of current flow in the same, piston 314 will experience a push away from or a pull towards coil 316. These polarity effects between the poles of the magnetic piston and the electrically induced poles of the coil are readily understood and are accounted for in use and operation as will be described now.

In use and operation, and to understand how the engine is started, assume for a moment that magnetic piston 314 is stationary and "above" or relatively upwardly disposed with respect to coil 316. The piston is, for the given cycle, poised to move in a direction towards coil 316. Gate 26 being dedicated or slaved to the position of the piston applies an appropriate voltage to means 60 so that the polarity switch thereof applies battery current into leads 318 whereby the polarity of the magnetic field set up or induced around coil 316 attracts the facing pole of magnetic piston 314. In this manner and for all relative cyclic movement of piston 314 with respect to coil 316, i.e., whether the piston is moving away from or towards the coil, the direction of current flow into coil 316 sets up a powerful magnetic field around the same which drives piston 314 in or complementary with the direction of piston travel. In other words, the polarity of the magnetic field set up around coil 316, which is dependent on the direction of current flow into same, is switched or reversed at appropriate times up gate 26 and means 60 so that the magnetic field acting on the confronting pole of piston 314 pushes the same when the piston is moving away from coil 316, and pulls the piston when the piston is moving towards the coil.

Thus by appropriately driving coil 316, i.e., sending current through the coil in a given direction, piston 314 can be correspondingly pushed and pulled in sleeve 11 thus cranking the engine.

Once the engine starts, gate 26 applies a voltage or signal to means 60 to interrupt the flow of battery current into coil 316. As the engine fires, rapid movement of piston 314 and the magnetic field emanating therefrom will induce a rapidly changing magnetic flux across coils 316 and 42. This rapidly moving flux will induce respective voltages in relatively low voltage coil 316 and relatively high voltage coil 42. The output of the former mentioned coil is then applied to the voltage regulator apparatus of means 60 to be regulated thereby and used to charge battery 22. The high voltage output of the latter mentioned coil is applied to a high voltage switch or distributor, not shown, to be electrically coupled to a given spark plug in time with the engine. As noted earlier, drive 54 is adapted indexingly to move frame 43 and hence coil 42 by means of link 56 and thus effect a timing of the high voltage induced in coil 42 and coupled to a given spark plug.

Turning now to FIG. 4 there is shown another embodiment of the present invention wherein a ferromagnetic piston and a spaced array of discrete coils act as a starter motor. In the embodiment of FIG. 4, ferromagnetic piston 12 reciprocates in a sleeve or cylinder 411. A plurality of discrete, low voltage high current coils 416a, 416b, and 416c are solenoidally wound around the external periphery of sleeve 411 in a localized spaced array triad. Each coil is fixedly attached to the outside circumferential periphery of sleeve 411 and thus is immobilized with respect thereto. The coils are disposed along sleeve 411 in such manner as essentially to cover or be spaced along the linear path traversed by piston 12 as the same reciprocates in cylinder 411. One lead or end 418a, 418b, and 418c of each respective coil is electrically placed at chassis ground. The other or hot lead 418a, 418b, and 418c of each respective coil is electrically coupled to a solid state sequential switch 62. Solid state sequential switch 62 receives low voltage, high current power from battery 22 along an electrical lead 64. In its most elemental form, sequential switch 62 would be an array of solid state switches (with each switch of the array being similar to solid state switch 20, noted above) and each individually controlled. In the embodiment of FIG. 4 (and for that matter, FIG. 5), three coils are shown. Thus switch 62 will include three individually controlled solid state switches, with each feeding a respective coil. Since the motion of the piston is cyclic with respect to the position of the coil, a standard timing device such as a ring counter or shift register will be included in or with sequential switch 62. The respective outputs of this timing device are electrically coupled to an individual one of the switches comprising switch 62. The input from position sensing device 27 is fed to gate 26 as a trigger signal. The output from the gate is fed to the counter or register as a clock signal, and in this manner, the application of current into an associated coil is individually controlled and timed to the position of the piston. In a more sophisticated version of the inventive apparatus, gate 26 and the counter in switch 62 that provides the sequential timing signals for each solid state switch of means 62 can be eliminated and replaced with a microprocessor or microcomputer. The microprocessor will then receive the timing or trigger input from means 27 and then provide for individual control of each solid state switch in sequential switch 62. Gate 26 is electrically coupled to sequential switch 62 by an electrical lead 66. Gate 26 controls the operation of sequential switch 62 during use of the invention as will be described now.

In use and operation, and to start or crank the engine, gate 26 is activated by means of ignition line 30. Assume for the moment that ferromagnetic piston 12 is at the lowermost position of its stroke or at bottom-dead-center as shown in FIG. 4. Gate 26 applies a signal to or, more precisely, clocks switch 62 and the latter turns on or sends battery current into coils 416b and 416c. The powerful complementary magnetic flux set up around these two coils acts to "pull" piston 12 upwardly when viewing FIG. 4. As piston 12 moves into and past coil 416b, gate 26 and sequential switch 62 operate to shut off current into coil 416b whereupon the powerful magnetic flux emanating from coil 416c continues to pull on piston 12 driving the same to its top-dead-center position and into coil 416c. Gate 26 and sequential switch 62 now operate to turn off coil 416c and turn on or send battery current into coils 416b and 416a setting up a powerful complementary magnetic flux about them which acts to pull piston 12 downwardly, when viewing FIG. 4. As piston 12 moves into and past coil 416b, sequential gate 26 and sequential gate 62 operate to shut off the flow of current into coil 416b. The powerful magnet field emanating from coil 416a continues to pull on the piston driving the same to its bottom-dead-center position and into coil 416a whereupon the cycle repeats. Thus by appropriately sequencing or sending battery current into a respective coil or coils, piston 12 will be "driven" or pulled through its entire stroke. Once the engine starts, sequential switch 62 interrupts the flow of battery current into the coil array whereupon piston 12 operates in conventional manner.

Using the principles of a pulsed or sequentially activated array of coils, other constructions readily suggest themselves. Turning now to FIG. 5 there is shown one such other construction wherein a sleeve 511 is formed with three annular recesses 512a, 512b, and 512c disposed on its inside periphery in stacked, concentric array. A solenoidally wound coil 516a, 516b, and 516c is disposed in a respective recess by embedding each coil in a brittle, high temperature dielectric material or frit 68. The inside or exposed peripheral face 68a of each frit filled recess is accurately machined to conform to the inside diameter or bore of sleeve 511. The leads of each solenoidal coil 518a, 518b, and 518c are electrically connected in the same manner as that which is described above with reference to the coils of FIG. 4. Thus each coil is driven by sequential switch 62.

A composite piston 512 reciprocates in sleeve 511. Piston 512 is comprised of a central ferromagnetic mass 70 embedded in a high-temperature dielectric frit or ceramic 72. Mass 70 and hence piston 512 is mechanically coupled to a connecting rod 74 by means of a wrist-pin 76 in conventional manner.

Use and operation of the embodiment of FIG. 5 is somewhat similar to the operation of the embodiment of FIG. 4, discussed above. Accordingly, one or a plurality of coils 516a, 516b, 516c is turned on by means of sequential switch 62 in accord with the direction of travel of piston 512 thus "pulling" the piston through its stroke and thereby effecting a cranking of the engine.

While piston 512 is shown as comprised of a ferromagnetic mass embedded in a high temperature dielectric, the ferromagnetic mass can also be embedded in a nonferromagnetic metal such as aluminum or brass.

Then, too, the piston can be made entirely of ferromagnetic material as well as being made of permanently magnetic material. In this latter case, sequential switch 62 will further include polarity reversing means, and both ends or leads 518a, 518b, and 518c of respective coils 516a, 516b, and 516c will be coupled to sequential switch 62. With this construction the polarity of the magnetic field induced around each coil can be individually controlled. Such control permits the magnetic field associated with one or several of the coils to pull on one end of the piston while the magnetic field associated with the other coils simultaneously acts to push on the other end of the piston.

For certain applications it might be desirable to place one or a plurality of ceramic annular collars in a given sleeve as an integral part thereof. For example, those parts of sleeve or cylinder 11 seen in FIG. 3 and about which coil 316 is wound can be formed of a suitable ceramic or glass. An array of such integrally formed dielectric collars 74 is seen in FIG. 4 wherein each coil is fixedly wound around a respective collar. Indeed, the entire sleeve can be comprised of a suitable ceramic or glass.

It is noted above with reference to FIGS. 1 and 2 that since the magnetic field associated with each coil is symmetric with respect to the center of the coil (for a symmetrically wound coil), the magnetic flux or field associated with each coil will drive a ferromagnetic piston towards the center of the coil to be held thereat by magnetic interaction. Movement of the piston away from the magnetic center, as it were, requires a force. Thus using this result it can be seen that by appropriately turning on, say, coils 416a, 416b, and 416c of FIG. 4, as the piston moves away from a given coil, a braking action on the engine can be achieved.

In the embodiment of FIG. 1, the inventive structure is shown operating with two pistons. It will be apparent, though, that increased starting torque, indeed, in some applications, the requisite minimum amount of starting torque, will require coordinated operation of several ferromagnetic pistons being driven in associated sleeves and coil windings. Such multiple, coordinated piston operation will increase starting torque. To prevent a situation where all ferromagnetic or magnetic pistons, as the case may be, might come to rest centrally disposed with respect to an associated coil, and thus create a condition or zone where no torque can be generated, the phase or positioning of one ferromagnetic piston with respect to another must be taken into account along with the position of a given coil 16 on an associated sleeve so as to prevent such a zone of no torque. Put another way, for all degrees of angular rotation of the crankshaft, there must be no occurrence where all magnetically driven pistons simultaneously reside in the center of an associated coil 16.

Because the polarity of the voltage generated by the inventive apparatus will depend on the polarity of the magnetic pole interacting with the relatively stationary coil, means 60 will, in some applications, include apparatus to insure a correct charging polarity with respect to the battery. For example, a diode bridge electrically connected between the coil and regulator would insure a defined input polarity to the regulator irrespective of the output polarity of the coil.

Because current into the respective coils is switched rapidly, the starter action of the present invention is capable of continuous high speed operation and as such can be used as the primary means of motive power for the engine or vehicle. For example, in FIG. 4, the electronically controlled pulsing of the coils or sequential operation thereof can be maintained at the relatively high speeds associated with a fast moving piston. Thus, during periods of constant velocity or those requiring minimal acceleration, internal combustion operation can be turned off and the inventive apparatus turned on whereupon such apparatus allows the engine to operate continuously as a high speed electric motor for powering the vehicle. For such a mode, the microprocessor (mentioned above with respect to FIGS. 1 and 4) would be programmed to switch between conventional combustion operation and electric operation depending on power requirements and fuel economy. It will be apparent that in certain applications more than one position sensing means 27 can be used in conjunction with gate 26 to turn on and turn off switches 20 and 62. Furthermore, since the output from means 27 is used as a trigger signal for the turning on and turning off of the solid state switches, as noted above, it might be desirable to interpose a Schmitt trigger between means 27 and gate 26, or between means 27 and the microprocessor, if one is used, and thereby to "square-up" the trigger signal applied to the gate or microprocessor.

While only a few embodiments of the present invention have been shown and described, it is to be understood that many changes and modifications can be made hereto without departing from the spirit and scope hereof.

What is claimed is:

1. Apparatus for converting a conventional internal combustion engine into a high speed electric motor wherein the engine is capable of switching between heat operation and propulsion by electricity including in combination a sleeve mounted in the engine block, a conventional piston of ferromagnetic material mechanically connected to a conventional crankshaft for reciprocal movement in said sleeve, a low voltage high current coil solenoidally wound around said sleeve in close proximity thereto, said coil extending a relatively short distance along the longitudinal length of said sleeve and being positioned thereon so as to be substantially centrally disposed with respect to the linear path swept by said piston, solid state switch means electrically connected between said coil and a battery, and means for turning on said solid state switch means and turning off heat operation, the former-mentioned means responsive to battery status and power requirements whereby when heat operation is shut off, the turning on of said solid state switch means applies electric current to said coil such that current is sent into said coil when said piston is moving in a direction relatively towards said coil, and current to said coil is interrupted when said piston is moving in a direction relatively away from said coil whereby magnetic interaction between said piston and the magnetic field induced around said coil drives said piston in a direction complementary with its motion so that the engine runs as either electrically propelled or heat operated.

2. An electric starter motor and generator for a combustion engine having a plurality of moveable pistons one of which is ferromagnetic comprising in combination a first low voltage, high current coil solenoidally wound around the sleeve in which said one piston reciprocates, said coil being positioned on the sleeve so as to be substantially centrally disposed with respect to the linear path swept by said one piston, electronically operated means for automatically sending electric current into said coil for inducing a powerful magnetic field therearound whereby current is sent into said coil when said one piston is moving in a direction relatively towards said coil and current to said coil is interrupted when said one piston is moving in a direction relatively away from said coil such that magnetic interaction between the magnetic field and said one piston produces a powerful magnetic force which moves said one piston in its direction of travel, a magnetic piston, a second low voltage high current coil solenoidally wound around the sleeve in which said magnetic piston reciprocates whereby as said magnetic piston reciprocates relatively to said second coil, the magnetic field emanating from said magnetic piston magnetically interacts with said second coil inducing a relatively low voltage, high current response thereacrosss.

3. A starter motor and generator of claim 2, a high voltage coil solenoidally wound around the sleeve in which said magnetic piston reciprocates, said high voltage coil being positioned on the sleeve so that the magnetic field emanating from said magnetic piston magnetically interacts with the last-mentioned coil inducing a relatively high volage, low current response thereacross.

4. The starter motor and generator of claim 3, means for selectively moving said high voltage coil relatively to the sleeve so as to effect a timing of the engine.

5. The starter motor and generator of claim 3, high voltage distributor means for distributing the relatively high voltage to a given spark plug.

6. An electric starter motor and generator for an internal combustion engine comprising in combination a magnetic piston, a low voltage coil and a high voltage coil each solenoidally wound around the sleeve in which said magnetic piston reciprocates and each positioned on the sleeve so as to interact with the magnetic field emanating from said magnetic piston, said low voltage coil being positioned on the sleeve so as to be subsantially centrally disposed with respect to the linear path swept by said magnetic piston, electronically operated means for automatically sending and switching the polarity of battery current into said low voltage coil whereby the polarity of the magnetic field induced around said low voltage coil operates to attract said magnetic piston when the same is moving or poised to move towards the last-mentioned coil and push said magnetic piston when the same is moving or poised to move away from this coil such that once the engine starts, said means interrupts the flow of battery current into said low voltage coil whereupon said magnetic piston moving relatively to said low voltage and high voltage coils induces across each an associated voltage which is used respectively to charge a battery and fire a spark plug.

7. The starter motor and generator of claim 6, means for indexingly moving said high voltage coil relatively to the sleeve and thus effect timing of the voltage developed thereacross.

8. The starter motor and generator of claim 6, said electronically operated means for automatically sending and switching the polarity of battery current including voltage regulator means electrically coupled to the output of said low voltage coil to regulate the output therefrom and apply such regulated output to the battery.

9. The starter motor and generator of claim 6, a dielectric annular region being integrally formed with the sleeve in which said magnetic piston reciprocates, said region comprised of a heat resistant rigid material with said low voltage coil being wound around said region.

10. Apparatus to convert a conventional internal combustion engine into a hybrid motor having two alternate modes of propulsion one of which is heat and the other of which is electric comprising an engine sleeve, a piston which exhibits magnetic properties and which is mechanically connected to a crankshaft for reciprocal movement in said sleeve, a plurality of solenoidally wound coils, each of said coils fixedly wound around said sleeve, each of said coils extending a relatively short distance along the longitudinal length of said sleeve whereby each of said coils is spaced one from the other thereby forming a stacked, spaced array about said sleeve, said spaced array being positioned with respect to said sleeve so as to be disposed along the linear path swept by such piston as the same moves relatively to said sleeve, an array of solid state switches, a corresponding one of the last-mentioned array being electrically connected between an associated one of said coils and a battery, and means for sequentially turning on one or a plurality of said switches while turning off heat propulsion, the last-mentioned means responsive to battery status and power requirements whereby when heat propulsion is shut off, one or a plurality of said switches is turned on in synchrony with the reciprocal movement of said piston whereupon current is sent into one or a plurality of said coils thereby, respectively, inducing a powerful magnetic field therearound, said piston interacting with the magnetic field to produce a powerful magnetic force which drives said piston in a direction complementary with its motion whereupon the engine runs as either electrically propelled or heat propelled.

11. The starter motor of claim 10, said piston being comprised of ferromagnetic material.

12. The startor motor of claim 10, said piston being comprised of a permanent magnet.

13. A starter motor for an internal combustion engine one piston of which is comprised of permanently magnetic material including in combination a stacked, spaced array of discrete solenoidally wound coils formed on the sleeve of the engine in which said piston reciprocates, each of said coils being fixedly held on the wall of the sleeve and being positioned with respect thereto so as to be disposed along the linear stroke swept by said piston as the same moves relatively to the sleeve, and electronically operated means for automatically sequentially applying electric current into each of said coils thereby, repsectively, inducing a powerful magnetic field therearound, the last-mentioned means operating to control individually the application of such current to an associated coil and including polarity reversing means for reversing the polarity of the electric current applied to each of said coils so that during the stroke of said piston, the magnetic field emanating therefrom interacts with the polarity of the magnetic field induced around an associated one of said coils to produce a magnetic force which moves said piston in its direction of travel.

14. A method of converting a conventional internal combustion engine into a high speed electric motor whereby the engine is capable of either heat or electric operation comprising the steps of placing a piston in the engine and made from a material that exhibits magnetic properties, winding a high current coil about the sleeve in which the magnetic piston reciprocates, the coil being positioned on the sleeve so as to be substantially centrally disposed with respect to the linear path swept by the magnetic piston, connecting a solid state switch serially between the coil and a source of high current, shutting off heat operation, biasing the solid state switch for turning the same on in synchrony with the reciprocal movement of the magnetic piston whereby current is sent into the coil inducing a powerful magnetic field therearound so that throughout the reciprocal movement of the magnetic piston, the magnetic field induced around the coil interacts with the magnetic piston resulting in a powerful magnetic force which drives such piston in a direction complementary with its motion, and switching between said step of biasing the solid state switch and heat operation whereby, depending on power requirements and battery status, the engine runs, respectively, as either electrically operated or heat operated.

* * * * *